2,744,825
ACYL LACTYLIC ACID PRODUCTS

Jerome B. Thompson and Bruce D. Buddemeyer, Kansas City, Mo., assignors to C. J. Patterson Company, a corporation of Missouri No Drawing. Original application December 12, 1951, Serial No. 261,382. Divided and this application May 10, 1954, Serial No. 432,011

3 Claims. (Cl. 99—91)

The present invention relates to novel fatty acid esters which have been found to possess unique properties when added to doughs in the production of baked products such as bread. More particularly, the invention relates to lactic acid and polylactic acid esters of fatty acids containing from 16 to 22 carbon atoms, and salts of such esters. The term lactylic acid is employed herein to designate both the monomeric lactic acid as well as the polymeric lactic acids.

The objects of the invention are to provide novel compounds produced from natural foods such as lactic and higher fatty acids; to produce compounds which when added to doughs improve the qualities of baked products; and to produce compounds of natural foods which will minimize the staling tendencies of baked products.

The esters in accordance with the invention can be prepared by conventional esterification methods, but it has been found advantageous to prepare them by heating the halide of the long chained fatty acid with a lactylic acid composition of the desired degree of polymerization under substantially anhydrous conditions. The polymeric lactylic acid compositions employed normally contain lactic acid of varying degrees of polymerization and consequently the degree of polymerization of any particular polymeric composition employed is an average degree of polymerization. Such average degree is easily determined by ascertaining the free acidity of the product and the average equivalent or molecular weight. It has been found that during esterification reaction with the fatty acid halides, the degree of polymerization of the lactylic acid composition may alter to a slight degree in view of further polymerization or depolymerization during such reaction.

The lactylic acid compositions employed in accordance with the invention in the preparation of the novel fatty acid esters are easily obtained from the lactic acid of commerce which is usually in the form of an 85% aqueous solution. The free water is readily removed and the condensation initiated by heating such solutions at 100°–110° C. for several hours with or without the aid of vacuum. Lactic acid upon heating at 180°–220° C. with or without catalysts polymerizes readily and progressively to form polylactylic acids. The progress of the polymerization can readily be followed by titration of samples withdrawn from the reaction vessel to determine the free acidity and average equivalent or molecular weight. Therefore, by terminating heating at the appropriate time it is possible to obtain anhydrous products containing any desired average number of lactyl groups, from one upward. For the purposes of the invention the upper limit of lactyl groups per polylactylic acid molecule is about 11, as products of a higher degree of polymerization are hard, quite insoluble plastics with elevated melting points.

The fatty acid halides employed in accordance with the invention are prepared by conventional methods from fatty acids containing from 16 to 22 carbon atoms, or fatty acid mixtures predominately containing such fatty acids. Fatty acids of lower molecular weights such as lauric acid and myristic acid are not suitable for the purposes of the invention as the lactylic acid esters thereof do not possess the unique properties when used in baking as are exhibited by the esters of the higher fatty acids such as palmitic, stearic arachidic and behenic acids and to a lesser degree by the esters of oleic acid. While the lactylic acid esters of the higher fatty acids improve the softness and keeping qualities of bread, the corresponding esters of the lower fatty acids such as lauric acid and to a much lesser extent myristic acid, have a deleterious effect upon the qualities of bread.

The products in accordance with the invention generally adhere to the following formula:

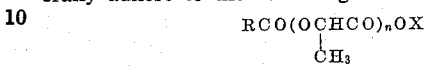

in which RCO is the acyl radical of the fatty acid or mixture of fatty acids having from 16 to 22 carbon atoms, X is a cation, and $n$ represents the average degree of polymerization of the lactyl radical of from 1 to about 8.5. The stearyl and palmityl polylactylates containing from 1 to 3 lactyl groups, particularly about 2 lactyl groups, have been found preferable.

The following examples will serve to illustrate the manner in which the novel compounds according to the invention can be prepared.

EXAMPLE 1

*Preparation of stearyl (1) lactylic acid ester*

A reaction flask containing a mixture 50 grams of a lactylic acid preparation, prepared as previously described, which had an average equivalent weight of 121.47 (1.43 lactyl groups per mol) and 124 grams of stearyl chloride (octadecanoyl chloride) was heated over a mineral oil bath to 50° C. while stirring to initiate the reaction. After the reaction had subsided, as evidenced by a reduction in the original copious evolution of HCl, the temperature of the reaction mixture was raised to and maintained at 70° C. for about 4 hours when the evolution of HCl ceased. Thereafter the temperature was raised to 130° C. to insure complete reaction.

The product was a honey colored plastic with a distinct lipoidal character having an average equivalent weight of 366.4 (1.14 lactyl groups per mol) and a melting point of about 50°–55° C.

EXAMPLE 2

*Preparation of stearyl (2) lactylic acid ester*

A five liter round bottom flask was charged with 350 grams of a lactic acid condensation product having an equivalent weight of 212.27 (2.69 lactyl groups per mol) and 499.81 grams of stearyl chloride. The flask was fitted with an efficient mechanical mixer having a glass blade and was placed in an oil bath and heated to 65° C. Vigorous reaction initiated and the temperature was lowered to and maintained at 35° C. until the vigorous reaction had subsided. The temperature was then raised to and maintained at 80° C. until evolution of HCl ceased.

The product was a light cream colored material with an average equivalent weight of 443.2 (2.21 lactyl groups per mol) and a melting range of about 45–50° C.

EXAMPLE 3

*Preparation of stearyl (8.5) polylactylic acid ester*

A mixture of 127.0 grams of a polylactylic acid composition having an average equivalent weight of 803.86 (10.9 lactyl groups per mol) and 48.01 grams of stearyl chloride was gradually heated while stirring over an oil bath over a period of several hours to a temperature of 180° C. at which time the evolution of HCl ceased. The product was brownish in color and semi-crystalline but of distinctly lipoidal character.

This product was purified by dissolving it in two volumes of warm chloroform and adding 5 grams of active charcoal and a few drops of concentrated H₂SO₄ to the solution. After standing over night the insolubles were removed by filtration and the chloroform solution was washed several times in a separatory funnel with water to remove the water solubles. The solution was then filtered and the chloroform removed by distillation under vacuum.

The product was a light honey colored solid with an average equivalent weight of 897 (8.5 lactyl groups per mol) and a melting point of about 58°–63° C.

EXAMPLE 4

*Palmityl (2) lactylic acid ester*

An exact equivalent of palmityl chloride was added to 20.95 grams of a polylactylic acid composition having an average equivalent weight of 212.27 (2.69 lactyl groups per mol) in a reaction flask. The flask was heated in a water bath at about 50° C. until the violence of reaction had subsided. The temperature of the bath was then raised to boiling and maintained at such temperature for about 3 hours.

The product was a pale yellow oily material with a distinct tendency to crystallize. It had an average equivalent weight of 450.69 (2.52 lactyl groups per mol).

EXAMPLE 5

*Polylactyl ester of hydrogenated fish oil fatty acids*

45 grams of a hydrogenated fish oil fatty acid product of an average equivalent weight of 294.68 was treated with 22 grams of thionyl chloride for 2 hours to prepare the mixed acid chlorides, and the excess thionyl chloride was removed by warming the mixture at 90–100° C. for several hours. The fatty acid mixture treated had approximately the following composition:

| | Percent |
|---|---|
| Myristic acid | 8 |
| Palmitic acid | 29 |
| Stearic acid | 18 |
| Arachidic acid | 26 |
| Behenic acid | 17 |
| Oleic acid | 2 |

The acid chloride mixture obtained was added to 31.99 grams of a polylactylic acid having an average equivalent weight of 209.1. The mixture was warmed at 75° C. for 3 hours with frequent agitation and the temperature was then raised to 90°–100° C. for 3 hours to remove the residual HCl.

The product had an equivalent weight of 454.4 which was slightly below the theoretical value and was a light tan lipoidal solid at room temperature.

Similarly other fatty acids or fatty acid mixtures primarily composed of fatty acids having from 16 to 22 carbon atoms can be employed to produce the desired lactylic esters selecting the proper lactylic acid composition to produce esters of the desired lactylic content.

The salts of the esters are preferably prepared by dissolving the esters in absolute alcohol, adding a small quantity of water, for example 5%, and the carbonates, bicarbonates, hydroxides, or salts of the desired cation. For example, NaHCO₃, K₂CO₃, CaCO₃, MgCO₃, AlCl₃, and NH₄OH were employed to produce the corresponding salts of the esters. The solvents are removed by vacuum desiccation to obtain the anhydrous salts.

The esters in accordance with the invention, both in free acid form as well as in salt form, impart improved qualities to baked products such as bread when added in small quantities to the dough, for example 0.1 to 1.0 preferably around 0.5% of the weight of the flour used to make the dough. They not only improve the overall quality of bread but also substantially improve the retention of the soft character of the bread during aging and therefore retard the apparent staling of bread.

The unexpected properties of the esters and salts thereof in accordance with the invention are exemplified by the results shown in Tables I, II and III, post, which compare the compressibility of bread samples baked from dough of ordinary formulation with samples baked from doughs of ordinary formulation with 0.5% of the compounds in accordance with the invention.

The white bread formula and baking procedure employed in preparing the test loaves of bread are as follows:

A sponge and dough procedure was utilized, the ingredients of which are enumerated with their corresponding percent levels. The percentage values are based on the total flour weight contained as one-hundred percent; this is usually termed "baker's percentage" and implies parts by weight with reference to the total flour as 100 parts.

The sponge consisted of 60% of the total bread flour, 2% lard, 0.5% yeast food, 2% yeast, and 35% water. These ingredients were mixed in a water-jacketed mixer. By adjustment of the cold water supply to the insulated jacket surrounding the mixing bowl, a sponge temperature of 26.7° C. was maintained. The components of the sponge were mixed one minute in low speed (44 R. P. M.), and one minute in high speed (88 R. P. M.). The resultant sponge was fermented for 4.5 hours in a fermentation cabinet; constant temperature and humidity were maintained, as measured by a hygrometer, 91% relative humidity with a dry bulb temperature of 29.4° C.

The sponge was subsequently mixed with the remaining portion of the formula consisting of 40% of the total flour, 3% dry skim milk, 2% salt, 6% corn sugar, and the remaining 25% water. The dough was mixed at low speed (44 R. P. M.) for 3 minutes, plus 5 minutes at high speed (88 R. P. M.) in the mixer. The dough piece emerged at a temperature of 26.7° C. Following a 35 minute floor time at the same constant temperature and humidity in the fermentation cabinet, 19 ounce loaves were scaled to produce a baked-out product of slightly over one pound. The dough pieces were given a 10 minute recovery time in a drawer maintained at 26.7° C. This measure corresponds to an overhead proofer in a commercial shop.

The doughs were moulded through a conventional drum type dough moulder. They were panned and placed in a proofing cabinet to raise. The bread pans utilized had a pan factor of 6.61. Their dimensions were as follows:

| | |
|---|---|
| Top | 4.4 x 10.5 inches. |
| Bottom | 3.75 x 9.75 inches. |
| Depth | 3 inches. |

The proofing cabinet was kept at constant temperature and humidity, 38.9° C. at an 80% relative humidity. The loaves were proofed to the desired volume, which was controlled by manipulation of a "gauge." The gauge measures the height above the top of the pan the dough has risen. The distance considered standard was one-half inch. The entire proofing process averaged slightly less than one hour.

When the dough had risen to the desired volume, it was baked for 28 minutes at a temperature of 218.4° C. From the oven, the bread was placed on a wire cooling rack for a one hour interval. The loaves were then packaged in air-tight polyethylene bags; uniform cooling was accomplished by spacing the test loaves approximately two inches apart on the bench until evaluation was to be made. The room temperature was not controlled, which makes for differences from day to day.

Incorporation of the test additive materials was made at the dough stage of the procedure. The various additive compounds of the invention were preweighed in containers. Baking evaluations, for effects on bread quality and softness, were made at a 0.5% level, referring to the flour weight of the formula as 100%. The test samples were emulsified in hot water, the quantity of which was retracted from the water requirements at the dough stage. The water solution was introduced into the mixing bowl following the dough ingredients, and any of the test material remaining in the container was washed into the mixer with the dough water. Following this process, no alteration was made throughout the procedure to the finished product.

Before measuring the compressibility of the bread samples, the loaves which had been produced as described above were stored at room temperature for 18 hours in the individual polyethylene bags. The compressibility was then measured by cutting slices of bread two inches thick from the center of the bread using a miter box to insure their thickness. The compressibility of these slices was measured using a penetrometer with a disc-shaped plunger 3 cm. in diameter weighing 265 grams. This plunger was permitted to penetrate the center of the bread slice for a period of exactly 10 seconds at which time its movement was arrested and the depth of penetration measured with a dial micrometer calibrated in .001 inch.

An average of twelve of such measurements on slices from four loaves of bread was taken as the measure of compressibility or relative softness as given in the tables; the compressibility values therefore being the average measured penetration of the plunger expressed in thousandths of an inch.

Since the staling of bread and therefore its softness is influenced by temperature as well as time, and the storage temperatures were not controlled, the values obtained for any given baking formula may vary when tests are not carried out simultaneously. Consequently it is necessary to compare the values obtained on simultaneously run tests. The compressibility values given in each separate table are therefore only relative to each other.

The following table shows the compressibility values obtained with breads in which the sodium salts of polylactylates (containing approximately 2 lactylic groups) of various fatty acids as compared with a control bread containing no additive.

TABLE I

| Additive | Compressibility |
|---|---|
| Control (no additive) | 643 |
| Sodium stearyl polylactylate | 750 |
| Sodium palmityl polylactylate | 747 |
| Sodium myristyl polylactylate | 593 |
| Sodium lauryl polylactylate | 46 |
| Sodium oleyl polylactylate | 655 |
| Sodium polyactyl ester of hydrogenated fatty acids of fish oil | 701 |

It will be noted that each of the polyactyl esters of fatty acids containing at least 16 carbon atoms gave improved compressibility values over the control. On the other hand myristyl and particularly the lauryl ester produced breads inferior to the control. In fact the product obtained with the lauryl polylactylate was such a hard product that it was hardly recognizable as bread.

The following table shows the effect of the lactylic acid moiety upon the compressibility values obtained:

TABLE II

| Additive | Compressibility |
|---|---|
| Control (no additive) | 746 |
| Sodium stearyl (1.14) polylactylate | 863 |
| Sodium stearyl (2.19) polylactylate | 900 |
| Sodium stearyl (3.25) polylactylate | 850 |
| Sodium stearyl (4.67) polylactylate | 880 |
| Sodium stearyl (5.50) polylactylate | 788 |
| Sodium stearyl (7.20) polylactylate | 803 |
| Sodium stearyl (8.40) polylactylate | 831 |

The lower lactylic acid moieties produce the greatest improvements, the best being that around 2, but as may be seen from the table all produce improved compressibility values.

The following table gives the comparative results obtained with free stearyl (2) polylactate and various salts thereof.

TABLE III

| Additive | Compressibility |
|---|---|
| Control (no additive) | 672 |
| Sodium stearyl (2) polylactylate | 802 |
| Potassium stearyl (2) polylactylate | 779 |
| Aluminum stearyl (2) polylactylate | 784 |
| Magnesium stearyl (2) polylactylate | 799 |
| Ammonium stearyl (2) polylactylate | 777 |
| Calcium stearyl (2) polylactylate | 745 |
| Hydrogen stearyl (2) polylactylate | 817 |

It will be seen from the above table that while the effect of the product in accordance with the invention does change slightly with different cations each gives a substantially improved result. It is furthermore of special interest that the effectiveness of the products in accordance with the invention is not dependent upon their water solubility as favorable results are obtained both with the water soluble and the water insoluble products. The water soluble products are however preferred in view of the ease in which they can be used.

While the above described tests were made on breads produced by the sponge and dough procedure it has been found that the compounds according to the invention produces comparable results on breads made by the straight dough process.

In all other respects, such as color, aroma, flavor, and crumb texture, the test loaves containing the compounds according to the invention were at least equal to, and usually superior to the control loaves. As the new acyl lactylic acid products are built from natural foods, and upon digestion or hydrolysis will decompose into such, the nutritive quality of bread is improved.

Having now described the means by which the objects of the invention are obtained, we claim:

1. A method of retarding apparent staling in yeast leavened baked products which comprises incorporating in the dough prior to baking from .1 to 1.0%, based on the weight of flour, of a fatty acid lactylate composition of the general formula

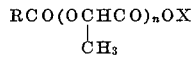

$$RCO(OCHCO)_nOX$$
$$\phantom{RCO(O}|\phantom{HCO)_nOX}$$
$$\phantom{RCO(OCH}CH_3$$

wherein RCO is the acyl radical of a fatty acid containing from 16 to 22 carbon atoms, X is a cation and $n$ is the average number of lactylic groups present in such lactylate composition ranging from 1 to 8.5.

2. A method of retarding apparent staling in yeast leavened baked products which comprises incorporation, in the dough prior to baking, about .5%, based on the weight of flour, of a fatty acid lactylate composition of the general formula

$$RCO(OCHCO)_nOX$$
$$\phantom{RCO(OCH}CH_3$$

wherein RCO is the acyl radical of a fatty acid containing from 16 to 22 carbon atoms, X is a cation and $n$ is the average number of lactylic groups present in such lactylate composition ranging from 1 to 8.5.

3. A baked leavened dough product having included therein a compound selected from the group consisting of acyl polylactic acid esters of fatty acids containing from 16 to 22 carbon atoms, and the salts thereof.

References Cited in the file of this patent

UNITED STATES PATENTS

| | | |
|---|---|---|
| 1,560,045 | Dunlap | Nov. 3, 1925 |
| 2,132,394 | Coith et al. | Oct. 11, 1938 |
| 2,132,436 | Raynolds et al. | Oct. 11, 1938 |
| 2,449,990 | Gresham et al. | Sept. 28, 1948 |
| 2,602,748 | Hansen | July 8, 1952 |
| 2,690,971 | Iveson et al. | Oct. 5, 1954 |